United States Patent [19]

Seregni

[11] 3,784,762

[45] Jan. 8, 1974

[54] AUTOMATIC TUNER DRIVE DEVICE APPLICABLE TO RADIO RECEIVERS WITH AN INCORPORATED MAGNETIC TAPE OR WIRE RECORDER AND/OR PLAYER

[76] Inventor: Renato Seregni, Cascina Emanuela, Solaro, Italy

[22] Filed: Sept. 18, 1972

[21] Appl. No.: 290,054

[30] Foreign Application Priority Data

Sept. 28, 1971 Italy ............................ 29194 A/71

[52] U.S. Cl. ............... 179/100.11, 325/471, 334/24

[51] Int. Cl. ....... G11b 31/00, H04b 1/32, H03j 3/00

[58] Field of Search .................. 179/100.11; 334/18, 334/20, 24, 39, 25; 325/471

[56] References Cited

UNITED STATES PATENTS

| | | | |
|---|---|---|---|
| 3,612,777 | 10/1971 | Ban | 179/100.11 |
| 3,597,553 | 8/1971 | Ban | 179/100.11 |
| 3,612,776 | 10/1971 | Ban | 179/100.11 |

*Primary Examiner*—Raymond F. Cardillo, Jr.
*Attorney*—Guido Modiano et al.

[57] ABSTRACT

An automatic tuner drive device applicable to radio receivers with an incorporated magnetic tape or wire recorder and/or player comprising pulleys arranged to cause the movement or rotation of the tuner unit, and connected to a a roller by means of an elastic endless belt. The roller is driven by any rotating member of the recorder and/or player unit.

1 Claim, 1 Drawing Figure

PATENTED JAN 8 1974 3,784,762
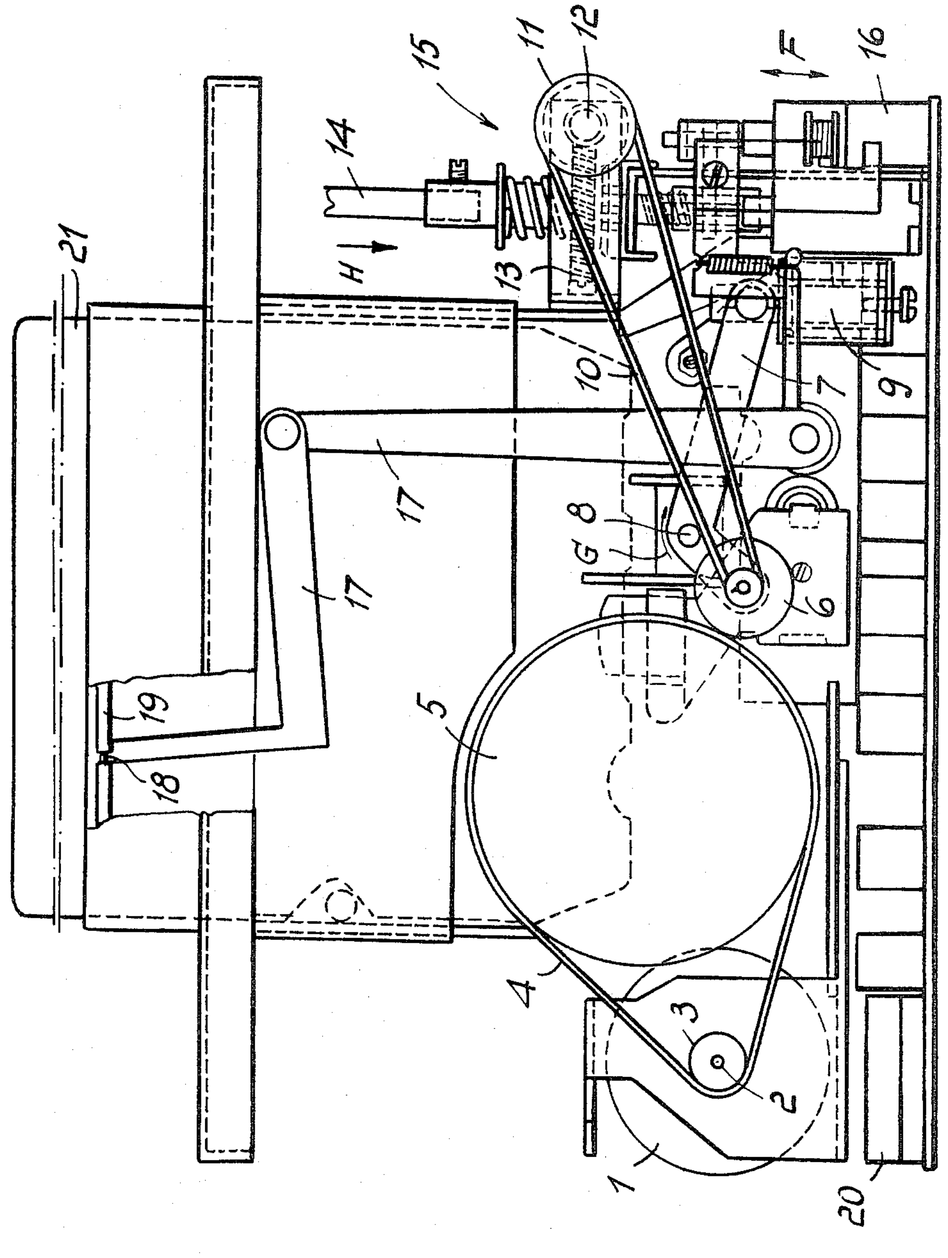

AUTOMATIC TUNER DRIVE DEVICE APPLICABLE TO RADIO RECEIVERS WITH AN INCORPORATED MAGNETIC TAPE OR WIRE RECORDER AND/OR PLAYER

BACKGROUND OF THE INVENTION

The present invention relates to an automatic tuner drive device applicable to radio receivers with an incorporated magnetic tape or wire recorder and/or player.

The advent of electronic components and printed circuits enables radios, recorders, players and other apparatus to be constructed in which the individual components are mounted in an extremely compact form so as to reduce the bulk of the apparatus to a minimum. In the field of radios with incorporated recorders and/or players, the automatic tuning of transmitting stations is at present carried out by using a suitable motor, controlled by a suitable pushbutton, which moves the tuning unit and its relative pointer. A suitable relay interrupts the operation of the motor as a signal is tuned in, by which the radio remains tuned to that particular received signal. Further operation of the pushbutton again operates the motor, and the tuning of other and successive signals is consequently proceeded with.

This known system, although giving satisfactory results, gives rise to the disadvantage of requiring space for positioning the motor, which, as stated above, is not always easy because of the extreme compactness of apparatus constructed at the present time.

A further disadvantage consists of the fact that the motor, even if of relative low cost, influences the final price of the unit.

SUMMARY OF THE INVENTION

An object of the present invention is to provide an automatic tuner drive device applicable to radio receivers with an incorporated magnetic tape or wire recorder and/or player which eliminates the disadvantages stated above.

This and other objects of the invention will better appear to persons skilled in this field from the description and claim which follows.

The automatic tuner drive device according to the invention comprises means arranged to cause the movement or rotation of the tuner unit, deriving its drive from any rotating member constituting part of the recorder and/or player unit, the starting of said rotating member being determined in a conventional manner by operating a pushbutton and its stopping by a conventional tuning relay.

It should be clear that, the inventive concept may be carried out practically in various ways depending on the type of radio and, in particular, on the type of recorder and/or player incorporated in said radio.

BRIEF DESCRIPTION OF THE DRAWINGS

One of the many embodiments of the device according to the present invention is illustrated by way of non-limiting example in the single FIGURE in the accompanying drawing, which shows diagrammatically the device according to the invention Assume that the device is mounted on a car radio provided with a player of the cartridge type, but evidently as specified above the inventive concept may be applied to any other type of radio providing it is equipped with a recorder and/or player.

DESCRIPTION OF THE PREFERRED EMBODIMENT

With reference to the stated FIGURE, the motor 1 of the magnetic type player is indicated, on the shaft 2 of which is keyed a roller 3 designed to cooperate with an elastic endless belt 4 for rotating the flywheel 5, which forms part of the player unit. The automatic tuner drive device consists essentially of a pinch roller 6 carried at one end of a bent lever 7 pivoted at 8 to a fixed part of the frame of the apparatus, the other end of which is connected to the armature of a relay 9. The roller 6 is connected by way of an elastic belt 10 to a pulley 11 keyed to the upper end of a worm 12 which engages with a gear wheel 13 carried by the shaft 14 for manual tuning. The gear wheel 13 is mounted on the shaft 14 by way of a friction clutch system generally indicated by the reference numeral 15, in order to enable manual tuning to be carried out even with the device connected. The rotation in one or other direction of the shaft 14 by a knob, not shown, causes the tuner unit 16 to move in the direction of the arrows F, and hence, by conventional levers 17, the pointer 18 is made to slide along the graduated scale or dial 19.

During normal operation of the already tuned radio, the pinch roller 6 is kept disengaged from the flywheel 5 and the relay 9 is de-energized. In order to start automatic tuning, the tuning knob (not shown) is pressed so as to move the shaft 14 a short distance in the direction of the arrow H and cause simultaneous energizing of the relays 9 and 20, giving oscillation in the direction of the arrow G of the lever 7 about its pivot 8 by the action of the relay 9, and hence the engagement of the pinch roller 6 with the flywheel 5 for being urged against the elastic belt 4, and the starting of the electric motor 1 by the action of the relay 20. The rotation of the pinch roller 6, driven by the flywheel 5, determines the rotation of the pulley 11, screw 12 and gear 13, and hence the rotation of the shaft 14 in one or other direction, according to the position of the switch 20 which reverse the direction of running of the motor 1, so giving consequent movement of the tuner unit 16. On reception of a signal, the two relays 9 and 20 de-energize simultaneously, consequently causing the pinch pulley 6 to disengage from the flywheel 5, either by the action of the elastic belt 10 or by the action of the return spring of the relay 9, and the motor 1 to stop.

The proposed design of disengaging the pinch roller 6 from the flywheel 5 is advantageous because of the fact that said flywheel could, on stopping the motor, carry out some further revolutions so upsetting the tuning, should the roller 6 be still engaged.

The insertion of the cartridge 21 into its seat cuts out the radio unit in the conventional manner, and cuts in the player unit.

I claim:

1. An automatic tuner drive device applicable to radio receivers with an incorporated magnetic tape or wire recorder and/or player unit, said player unit comprising a tape driving device including a roller and an electrical motor for driving the said roller, a flywheel mounted for rotation therein, a first elastic endless belt wound around the said flywheel and the said roller; the said tuner drive device comprising a casing housing therein the said radio receiver and said player unit, a bent lever mounted pivotally in said casing, a rotatable pinch roller mounted at one end of said bent lever, an armature for a first relay mounted at the other end of said bent lever, said pinch roller being arranged to engage with said flywheel for being urged against said elastic belt wound thereon; a driven pulley rigid with a worm controlling the tuner unit; a gear wheel in meshing engagement with said worm, a shaft integral with said gear wheel having a knob at the outer end thereof, a second elastic belt operatively connecting said pinch roller and said driven pulley, the said second elastic belt resiliently forcing the said bent lever to move into a first position in which said pinch roller is remote from said flywheel; the said first relay upon being energized by an electrical signal applied thereto by manually pressing said knob, moving said bent lever from said first position to a second position in which said pinch roller engages with said flywheel; a second relay controlling the starting operation of said electrical motor upon said knob being pressed thereby determining movement of said tuner unit; said first and second relays being de-energized simultaneously upon reception of a signal and thus said pinch roller is caused to disengage from said flywheel.

* * * * *